Figure 1:
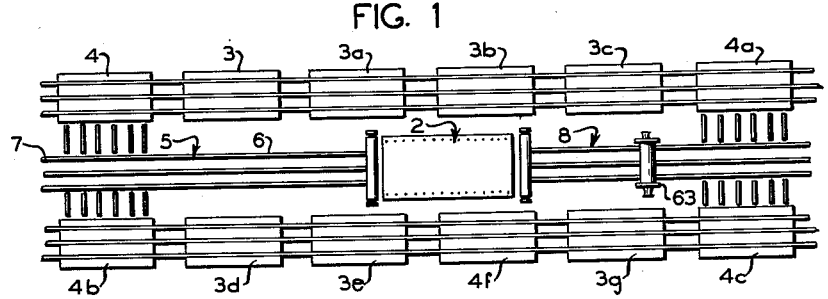

Oct. 21, 1952     D. E. HERVEY     2,614,590
PRESS PLATEN FOR LAMINATED MATERIAL
Filed Aug. 27, 1946     3 Sheets-Sheet 1

*INVENTOR.*
D. E. HERVEY
BY
A. Yates Dowell
ATTORNEY

Oct. 21, 1952  D. E. HERVEY  2,614,590
PRESS PLATEN FOR LAMINATED MATERIAL
Filed Aug. 27, 1946  3 Sheets-Sheet 2

*INVENTOR.*
D. E. HERVEY
BY
A. Yates Dowell
ATTORNEY

Oct. 21, 1952 — D. E. HERVEY — 2,614,590
PRESS PLATEN FOR LAMINATED MATERIAL
Filed Aug. 27, 1946 — 3 Sheets-Sheet 3
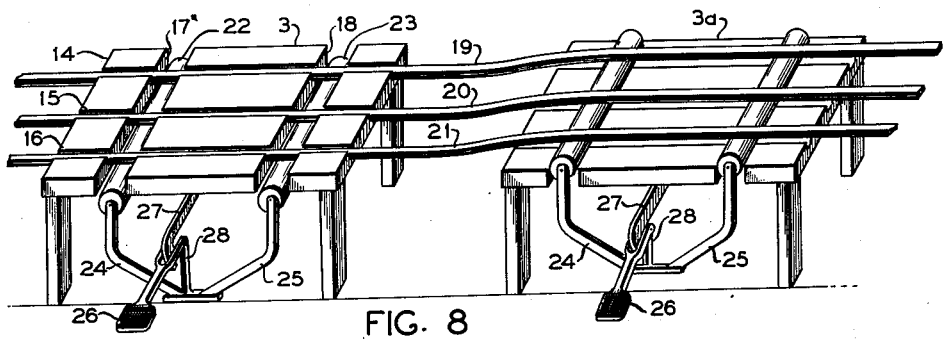
FIG. 8
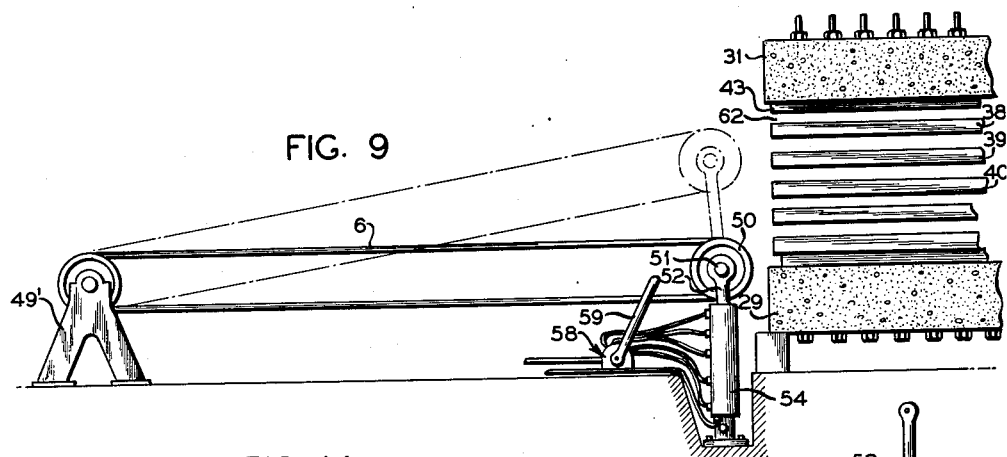
FIG. 9
FIG. 10
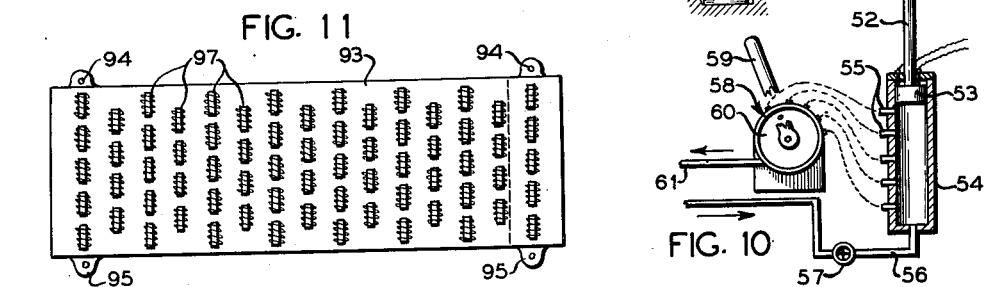
FIG. 11
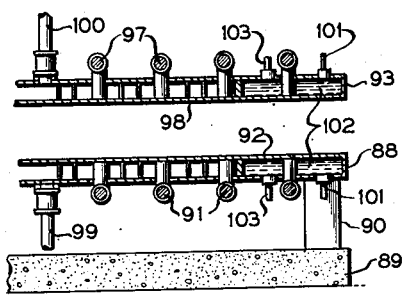
FIG. 12
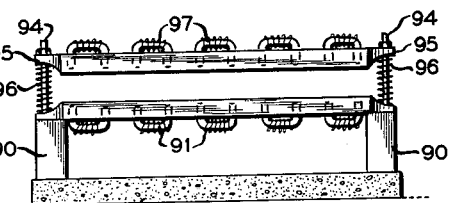
FIG. 13
INVENTOR.
D. E. HERVEY
BY
A. Yates Dowell
ATTORNEY Patented Oct. 21, 1952

2,614,590

UNITED STATES PATENT OFFICE 2,614,590

PRESS PLATEN FOR LAMINATED MATERIAL

David E. Hervey, Old Fort, N. C., assignor to Hervey Foundation, Incorporated, a corporation of Maryland Application August 27, 1946, Serial No. 693,243

4 Claims. (Cl. 144—281)

This invention relates to improvements in method and apparatus for manufacturing laminated sheet assemblies and particularly to improved apparatus and an improved method for producing large sheets of laminated material such as plywood and truss panels having plywood faces.

Some of the best commercial glues or binders capable of producing a satisfactory bond require the addition of heat during the bonding operation in the press, and in the use of nearly all other bonding agents some heat materially speeds the process. In order to supply the necessary heat it is customary to provide the press with a heated bed and pressure head and with a number of heated platens placed between adjacent surfaces of the face sheets of adjacent plywood assemblies. The press bed and pressure head are usually heated by steam, although it has been proposed to use electrical resistance to supply the necessary heat, and pressure is applied to the stack of veneer sheets by hydraulic rams or jacks.

This conventional practice is subject to various defects and limitations which result in waste of time and material, high equipment and operating costs, and an inferior product and preclude the commercial production of individual plywood sheets or panels except in extremely limited size.

The platens used are stiff iron plates with internal passages for the flow of heating medium, such as steam, and the surfaces of these platens have to be machined flat within very close tolerances. This is an expensive and difficult operation and even where the surfaces are originally within the required tolerances temperature changes have a tendency to warp the plates so that the surfaces are no longer flat. Because of these difficulties it has not been found possible to provide presses capable of making plywood boards materially larger than the conventional four foot by eight foot boards.

Certain present day uses of plywood require boards or sheets and panels of many times the area of this conventional maximum size.

One great difficulty in present conventional practice is the lack of constant pressure against the sheet material at every point during the entire bonding process to allow for the flowing and shrinking and swelling of the materials. A true, constant, overall equal fluid pressure has not been heretofore developed.

A further difficulty in present conventional practice is the lack of any provision in the press and platens to compensate for inequalities in the thickness and hardness of the veneer sheets. This defect results in the production of plywood sheets some parts of which are over compressed even to the extent of crushing the wood fibers over small areas, and other parts of which have not had sufficient pressure to properly set and cure the bonding material, thus resulting in an inferior product.

The plywood forming equipment as used at present could not be used in its present form for the mass production of the large size sheets of plywood or large panels. As a matter of fact, there is at present no equipment available for laying up and gluing on a multiple production basis plywood sheets or panels materially larger than the conventional four foot by eight foot panels at present in production.

Some changes in the presently used equipment have been proposed but have not resulted in any material improvement. For example, it has been proposed to use a press having flexible metal pillows or cushions between the adjacent surfaces of the plywood sheets to attempt to equalize the pressure over the sheet surface. Since there is no stiffness, such equipment would produce warped or bent sheets and they could not be relied upon for production of high quality material and would also require a loss of time in the loading and unloading operations. It has also been proposed to make the platen surfaces flexible in one direction by securing internal transverse stiffening members alternately to the opposite face plates of platen. Such an apparatus would provide no material improvements, since it would be flexible in only one direction and thus could not equalize the pressure over the surface of the plywood sheets and would have the additional disadvantage of applying unequal pressure to the sheets, the pressure being greater along the lengths of the transverse stiffening members.

It is among the objects of the present invention to provide improved manufacturing equipment for the mass production of large plywood sheets or panels of laminated material, which equipment is capable of producing the highest grade product at an extremely rapid rate of production.

A further object resides in the provision of an improved press in which large size sheets of laminated material can be bonded under conditions of substantially uniform pressure and temperature continuously over the entire surface area of the sheets.

The improved press may be used for either the hot press or the cold press process by merely reducing the heat for the cold process and correspondingly extending the time.

A still further object resides in the provision of an improved press for bonding laminated material which does not require accurately machined surfaces and can thus be made in large sizes at low cost, but which at the same time is fully effective to compress laminated sheets into material, such as plywood board, with substantially uniform surface pressure and to apply uniform heating to the entire area of the surface of the plywood or laminated material.

An additional object resides in the provision of an improved press which may be used to manufacture either laminated board or building panels or trusses having laminated material faces and internal supporting members without the necessity of any material changes or modifications in the press for producing the two types of product.

Figure 2:
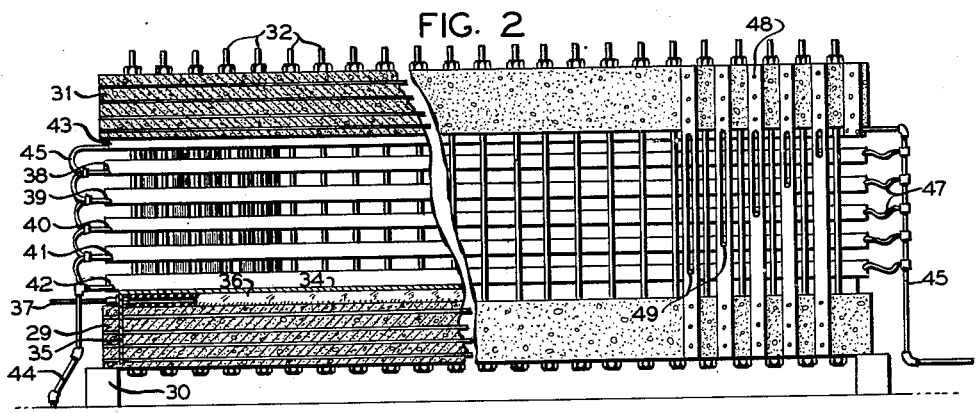
Figure 3:
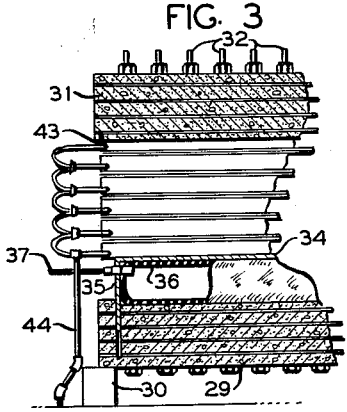
Figure 4:
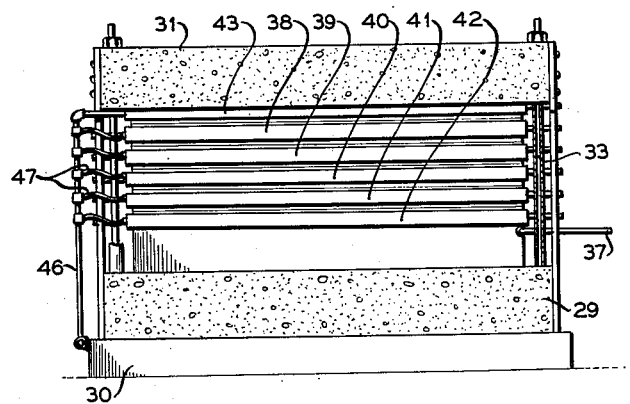
Figure 5:
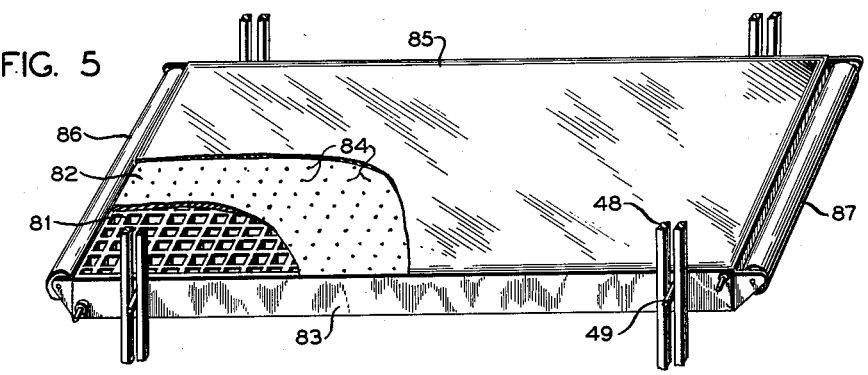
Figure 6:
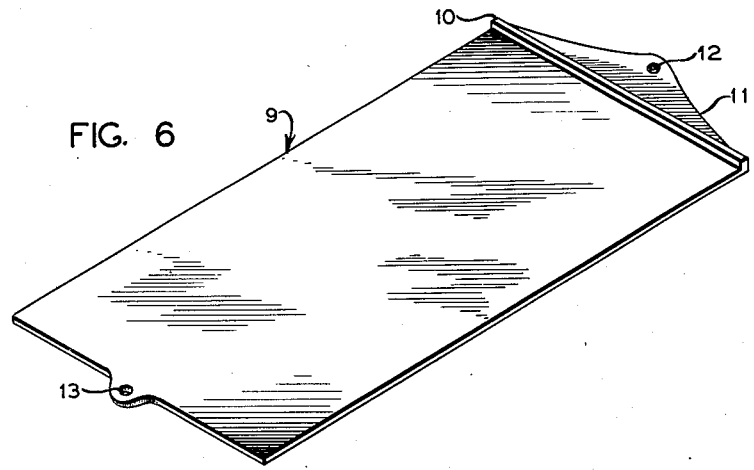
Figure 7:
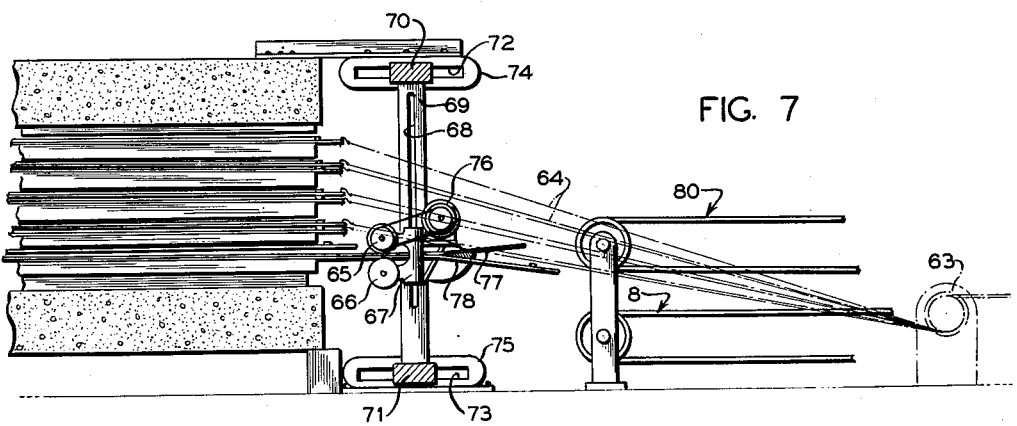

Other objects and advantages will become apparent from a consideration of the following description taken in conjunction with the accompanying drawings, wherein:

Fig. 1 is a diagrammatic plan view showing a bonding press, stations for laying up the material to be bonded and conveyors associated with the laying up stations in the press;

Fig. 2. a side elevational view of a press illustrative of the invention, a portion being broken away as shown in section to better illustrate the construction thereof;

Fig. 3, a sectional view of a fragmentary portion of the press showing the press in operative condition to compress a charge of material therein;

Fig. 4, an end elevational view of the press shown in Fig. 2;

Fig. 5 a detailed isometric view of a platen used in the press;

Fig. 6. an isometric view of a caul for supporting material in the press;

Fig. 7, an elevational view of the discharge end of the press showing means for extracting compressed material from the press;

Fig. 8, a diagrammatic isometric view of a pair of material laying up stations;

Fig. 9, an elevational view of the feed end of the press showing a conveyor for feeding the laid-up material into the press;

Fig. 10, a detailed view of a conveyor elevator and control therefor;

Fig. 11, a top plan view of a modified form of a press using electromagnetic means for applying the bonding pressure to sheet material to be laminated;

Fig. 12, a sectional view of a fragmentary portion of the press illustrated in Fig. 11; and Fig. 13, an end elevational view of the press shown in Figs. 11 and 12.

With continued reference to the drawings and particularly to Fig. 1, the press is generally indicated at 2 and is shown in detail in Figs. 2, 3 and 4. Exposed convenient to the press there is a plurality of laying up tables or stations indicated at 3 to 3g, inclusive. These tables are preferably arranged in two parallel lines disposed one at each side of the press and at the ends of these lines there are transfer stations as indicated at 4 to 4c, inclusive. Between the two lines of lay up tables at the feed end of the press there is a conveyor generally indicated at 5 composed of two longitudinally aligned portions 6 and 7 and at the discharge end of the press there is a conveyor generally indicated at 8.

In the manufacture of plywood sheets use is made of a metal caul as illustrated in Fig. 6 and generally indicated at 9. This caul is a flat sheet of suitable metal, such as aluminum, having at one end a stiffening bar 10 from which extends a tongue or tab 11 provided with an aperture 12, the tab being shaped to distribute force applied to the aperture along the length of the reinforcing bar 10. At its opposite end the caul is provided with an apertured tongue 13 for a purpose which will presently appear.

With the indicated apparatus plywood sheets may be conveniently manufactured in the following manner:

A supporting caul 9 is placed on the top of each of the lay up or assembly tables 3 and is covered with a layer of wood veneer. This veneer will ordinarily be in pieces having an area much less than the area of the caul and these pieces are fitted together and secured by some suitable means such as an adhesive tape. A layer of bonding material such as solidified sheet glue is then placed on the veneer surface and a second layer of veneer placed on the glue with the pieces arranged so that their grain is transverse to the grain of the pieces constituting the first layer. The second layer may be held in position by stitching it to the first layer by wire staples. A second layer of bonding material is then applied and the process continued until the desired number of plies or sheets has been built up on the caul.

Two of the lay up or assembly tables, for example tables 3 and 3a, are diagrammatically illustrated in Fig. 8. The table 3 is provided in its top surface with a series of parallel longitudinal grooves 14, 15 and 16 and with a pair of spaced transverse openings 17 and 18. The table 3a is provided with similar grooves and openings. Parallel conveyor belts 19, 20 and 21 extend through the grooves in the table tops and are maintained in motion. These conveyor belts extend along the entire row of assembly tables at one side of the press and may be continuous or, if more convenient, may be provided in two or more sections. The grooves which the belts pass have a depth somewhat greater than the thickness of the belts so that the belts normally lie beneath the working surface of the corresponding assembly table. A roller 22 is positioned in the opening 17 and a similar roller 23 is positioned in the opening 18, the rollers being below the conveyor belts and supported by movable link members as indicated at 24 and 25, respectively. A foot pedal 26 is supported on a bracket 27 and operatively connected with the links 24 and 25 by a suitable link 28 so that pressure on the foot pedal will raise the rollers to lift the conveyor belts above the working surface of the table.

With this arrangement as soon as the assemblies have been completely laid up on the cauls on the various tables the foot pedal attached to the table at the end of the line on the feed end of the press, for example the table 3, is depressed causing the conveyor belts to pick up the caul and veneer assembly thereon and move the caul and assembly as a unit to the transfer station 4 from which it may be moved over suitable rollers or by other transfer means to the conveyor 5 which will in turn carry it to the feed end of the press 2. After the table 3 has been emptied the pedal corresponding to table 3a may be depressed to move the caul and assembly on that table to the transfer station and this may be repeated for tables 3b and 3c. Subsequently the assemblies on tables 3d, 3e, 3f, and 3g may be moved in succession to the transfer station 4b from which they are fed into the press 2. The number of lay up or assembly tables should not be less than the number of veneer assemblies that can be placed in the press at one time.

As the compressed and bonded material is extracted from the press the cauls are separated from the plywood and dropped onto the conveyor 8 from which they are removed at the transfer stations 4a and 4c and returned to the assembly tables in succession so that the assembly process may be repeated. The compressed and bonded plywood on removal from the press is placed on another conveyor above the conveyor 8 which carries it to a suitable location at which it may be stored or further processed to form structural panels or other finished products.

The press, as particularly illustrated in Figs. 2, 3 and 4, comprises a fixed lower member 29 of reinforced concrete resting upon a base or foundation 30 and a fixed upper member 31 also of reinforced concrete secured to the member 29 by suitable spaced tie rods 32 located at frequent intervals along the side edges of the two members. The weight of the upper member may be supported by suitable spacer tubes 33, surrounding some or all of the tie rods 32.

The members 29 and 31 are of sufficient size to provide an area adequate to form a plywood sheet large enough to completely cover a wall of the building such as a dwelling house, a width of at least 12 feet and a length of 30 feet or more being contemplated at present. The width may be increased within the practical limits of the strength of the width or span of the reinforced concrete slabs and the length may be increased almost indefinitely and is limited only by the maximum practical useful length of plywood sheets.

The major portion of the top surface of the lower slab 29 is covered by the top wall 34 of a hollow metal boss having an open bottom and having its side walls as indicated at 35 received in grooves provided in the slab 29. The top wall 34 of the boss constitutes a movable platform which may be moved toward the top slab 31 to place the contents of the press under pressure. A pneumatic bag 36 is disposed between the platform 34 and the top face of the lower slab 29 and is connected through a pressure fitting 37 with a source of fluid under pressure such as compressed air. The bag is preferably formed of rubber lined fabric and is of a size such that when it has raised the platform 34 to its uppermost position in the press the material of the bag is not placed under tension by the pressure of the contained air.

A plurality of platens as indicated at 38, 39, 40, 41 and 42 are disposed in the space between the platform 34 and the lower surface of the upper slab 31. These platens are substantially parallel and equally spaced and are sufficiently rigid to hold their shape when the press is empty. A hollow member 43 corresponding generally to a half of one of the platens is preferably secured to the under surface of the slab 31. A steam pressure line 44 is connected to the platens by suitable flexible connections as indicated at 45 and a steam exhaust line 46 also connected to the platens by similar flexible connections 47. The steam lines are preferably located at opposite ends of the platens but are disposed to one side or the other of the press so that they do not interfere with feeding material into the press and extracting it therefrom. The member 43 is also connected with the steam pressure line and in the pressure exhaust line by flexible connections similar to the connections 45 and 47. The platens are supported in operative position by suitable means such as by respective longitudinally slotted vertical members 48 and pins 49 extending outwardly from the platens into the slots in the vertical members. As is clearly shown in Fig. 2 the slots in the vertical members terminate at their lower ends at different levels which position the platens in their properly spaced condition when the press is empty. Preferably four sets of vertical members 48 and corresponding pins are provided located one at each side of the press adjacent each end thereof.

Suitable means, as illustrated in Fig. 9, are provided for feeding the caul and veneer assemblies from the conveyor 5 into the press. As illustrated the conveyor portion 6 is pivotally supported at its end remote from the press on suitable brackets as indicated at 49' and has its front roller 50 mounted on an axle 51 journalled in the upper end of a pair of parallel rods as indicated at 52 associated with mechanism which constitutes an elevator for the front end of the conveyor. As the two elevator devices located one at each side of the conveyor are similar, a detailed description of only one of them is considered sufficient for the purposes of this disclosure. As illustrated in Fig. 10 a rod 52 is connected at its lower end to a piston 53 slidable in a vertical cylinder 54 provided along one side thereof with a plurality of spaced ports 55. A fluid pressure line 56 is connected to the bottom of the cylinder and contains a suitable cut-off valve 57 and a manual control member generally indicated at 58 is operatively connected with both of the elevator cylinders. In operation a number of assemblies corresponding to the number of spaces between the various platens are placed in succession adjacent to the conveyor portion 6 and one is moved onto 6. Fluid under pressure is then admitted through the line 56 to the bottoms of elevator cylinders and the corresponding pistons are forced upwardly to their upper limiting position. When the pistons reach their uppermost position the operation of the pump supplying the pressure fluid is discontinued and the valve 57 is closed retaining the pistons in their uppermost position by trapping the fluid, such as oil, in the cylinders below the pistons. The handle 59 of the manually controllable multiple valve 60 is then moved to a position in which the uppermost of the ports 55 is connected with the drain or exhaust line 61 leading back to a suitable sump or reservoir connected to the pump intake. The pistons will then descend until they cut off the corresponding top ports and the end of the conveyor nearest to the press will then be at the proper level for insertion of the assembly into the top space 62 between the upper surface of platen 38 and the lower surface of pressure plate 43 on the under surface of the top slab 31. After this first assembly has been placed in the press another assembly is moved onto conveyor portion 6 and the handle 59 will then be moved to connect the next lower port with the exhaust line which will lower the elevated end of the conveyor to a position to which this second assembly may be moved into the space between the platens 38 and 39 and this process may be repeated until all of the assemblies have been moved into the proper spaces in the press.

The assemblies are moved from the conveyor 6 into the corresponding spaces between the press platens by suitable cable means as will be presently explained.

After the assemblies have been properly located in the press compressed air is admitted into the pneumatic bag 36 to raise the platform 34 and force the various platens together and toward the top slab 31, the pins 49 moving upwardly in the slots in members 48 during this compressing operation. Steam is admitted to the interiors of the platens through the pressure line 44 and after circulating through the interiors of the platens is released through the exhaust line 46, heating the platens in its passage therethrough to properly cure the bonding material in the plywood assemblies.

The pressure in bag 36 is maintained at a somewhat greater value than the pressure of the steam to maintain continuous overall pressure on the stack of platens and plywood. The platens are constructed, as will be presently explained, in connection with Fig. 5, in a manner which enables them to transmit the uniform fluid pressure over the entire surfaces of the plywood assemblies with which they are in contact.

After the assemblies have been properly cured to form plywood sheets the steam is cut off from line 44 and the pressure in bag 36 is released permitting the platens to return to their open press positions as illustrated in Fig. 2 and the completed plywood assemblies are then removed from the press by suitable means such as is illustrated in Fig. 7.

As shown in this Fig. 7 a power winch 63 is disposed at a location convenient to the discharge end of the press and a plurality of cables 64, each having a hook secured to the end thereof, is provided. After the press has been released a cable is attached by its hook through the aperture 12 in the caul of the lower assembly. At the same time a cable at the feed end of the press is attached by a suitable hook to the aperture 13 in the corresponding end of the caul. The cable attached to the aperture 12 is then wound on the drum of the winch and tension applied thereto to break the assembly loose from the inner adhesion to the contacting platens and move the assembly a short distance out of the press. The cable is then detached and laid aside and a pair of rollers 65 and 66 are brought into contact with the respective upper and lower sides of the assembly. These rollers are mounted on a carriage 67 movable along a guideway 68 in a vertical member 69, the ends of which are connected to carriage members 70 and 71 movable along guideways 72 and 73 in respective upper and lower horizontal members 74 and 75. A roller driving motor 76 is carried on the carriage 67 and manually operable means 77 are provided to force the rollers together to firmly grip the assembly to be extracted from the press. With the rollers in firm contact with the assembly the motor 76 is energized and the rollers then pull the assembly out of the press. The carriage 67 also carries a separating bar or knife 78 which is inserted between the caul and the plywood assembly so that the caul is separated from the plywood as the assembly is withdrawn from the press, the caul being received by the lower conveyor 8 and the plywood sheet by an upper conveyor 80.

As the caul is withdrawn from the press the cable attached to the caul by means of the aperture 13 is drawn through the space between the corresponding press platens and is detached from the caul after the caul has been fully withdrawn. One of the cables 64 is then attached to the cable which was drawn through the press and the cable 64 is then drawn backwardly through the press from the discharge end to the feed end. This process is repeated until all of the assemblies have been withdrawn from the press and all of the cables 64 have been drawn backwardly through corresponding interplaten spaces.

In reloading the press the end of a cable 64 at the feed end of the press is connected to the aperture 12 in a caul and the cable is then wound on the drum of the winch 63 and the winch operated to pull the assembly through the press to the position in which the bonding of the material is to take place.

The construction of the platens is particularly illustrated in Fig. 5. Each platen comprises a rigid core portion 81 of generally honeycomb construction in which the wall portions are pierced so that steam may flow through the core from one end of the platen to the other end and will come in contact with the entire area of the platen. A pair of flat metal plates, one of which is indicated at 82, are secured one on each side of the core member to provide a flat rigid platen having parallel planar faces. The core member is surrounded by edge or wall members as indicated at 83 which are also attached to the edges of the face members. One or both of the face members is provided with a large number of small apertures or perforations 84 preferably substantially uniformly spaced over the entire area of the face member and a sheet 85 of comparatively thin flexible sheet metal is placed over the perforated face member and secured at its edges to the side walls or edge members in a manner to provide a fluid-tight seal between the flexible members and the platen side walls.

With this construction when steam under pressure is admitted to the interior of the platen some of it will flow through the perforations 84 and act against the flexible cover 85 to force this cover into continuous contact with the veneer over the entire surface area of the veneer assembly.

By this means a substantially uniform pressure is applied to the entire area of the plywood veneer regardless of slight variations in the thickness of the veneer sheets, variations in the hardness of the veneer, or changes resulting from the bonding process, so that a uniform bond over the entire area is obtained. By thus providing uniform pressure over the entire surface area a perfect bond can be obtained at pressures far below those necessary where the bonding is carried out between plain rigid surfaces as it is then necessary to apply sufficient pressure to crush some of the thicker portions of the veneer in order to bring any bonding pressure at all to bear on the thinner portions. Even where such high pressures are used the pressure on some portions of the surface area of the veneer assembly is so light that perfect bonding does not take place, thus resulting in an inferior product.

Where it is desired to bond two assemblies at a time between the opposed faces of a pair of adjacent platens, an elastic cushion may be assembled between the two plywood assemblies before they are placed in the press. Such a cushion may comprise either an inflatable pneumatic bag or a solid sheet of resilient material such as a synthetic rubber capable of withstanding the bonding temperatures and such a cushion will act to uniformly distribute the pressure over the entire surface area of the contacting plywood assemblies in a fluid-like manner so that all portions of the assemblies will be perfectly bonded.

Preferably each platen is provided with a pair of rollers 86 and 87 disposed one at each end thereof so that the cauls and the plywood assemblies thereon may be drawn into the press and removed therefrom without injuring the cauls by scraping them over sharp edges of the platens and without injuring or unduly wearing the platen surfaces.

If it is desired to form laminated sheet material with other than plane surfaces suitable forming members may be attached to the surfaces of the platens to provide the surface shape desired. These forming members may provide dished or curved members or corrugated members as may be desired. When such forming members are used a cushion of resilient material will be included between two comparatively thin assemblies of sheet material so that a substantially uniform pressure can be maintained on the sheet material regardless of the shape of the forming surfaces.

In the modified form of press illustrated in Figs. 11, 12, and 13, a fixed lower plate 88 is supported on a suitable foundation 89 by walls or columns 90. A plurality of U-shaped electromagnets 91 are secured to the plate 88 in position such that the ends of their pole pieces are in contact with a metal pressure plate 92. A movable upper plate 93 is positioned above the plate 88 and guided relative thereto by suitable vertical guide rods 94 extending through apertured brackets 95 secured to the upper plate. Preferably compression springs 96 are disposed between the two plates to exert a separating pressure thereon.

U-shaped electromagnets 97 are carried by the upper plate with the ends of their pole pieces in contact with a metal upper pressure plate 98. The plates 88 and 93 are made hollow and have steam pressure lines 99 and 100 connected thereto and suitable steam exhaust lines, not illustrated. Suitable means are provided for electrically energizing the coils of the electromagnets and when it is desired to bring the upper and lower plates together the energization produces opposite polarity between each corresponding upper and lower magnets so that a strong magnetic attraction will be exerted between each registering pair of magnets including one upper and one lower magnet. As is indicated in Fig. 11 the electromagnets are distributed over the surface of the plate in a manner to provide a uniform pressure over the entire surface area.

With the press in open condition, as illustrated, in Fig. 13, wherein the upper plate is supported above the lower plate between springs 96 a charge of assembled sheet material, preferably supported on a suitable caul, and including two sheet assemblies separated by an elastic cushion, is inserted into the press. The electromagnets are energized to pull the upper and lower plates of the press together and heat is applied to these plates through the steam pipes 99 and 100. The heat and pressure are maintained until a satisfactory bond has been formed between the sheets of the assemblies and then the current energizing one set of electromagnets is gradually cut off and reversed, thereby reversing the polarity of this set of magnets with respect to the polarity of the opposed set of magnets. This operation causes a separating force to be set up between the two sets of magnets which will assist the springs 96 in quickly opening the press. After the press has been opened the finish charge of material is removed therefrom and a new charge inserted after which the heating and pressing operation is repeated.

In order that sheets of ply or laminated material may be developed (which are larger than the dimensions of the press) by successive steps, long or continuous assemblies are fed into the press at successive steps or intervals allowing time for bonding the area in the press at each step. Cooling devices shown in Fig. 12 consisting of cold water inlets 101 into chambers 102 and warm water outlets 103 provide areas in the press which together with the pressure system provide pressure on the assembly without sufficient heat to set the bond. Thus a distinct line of cure in the assembly is provided with respect to adjoining portions of large assemblies which line is under suitable pressure. This prevents precuring at points at the edge of the press without sufficient pressure.

By means of the above described method and apparatus it has been found possible to rapidly and economically produce laminated material such as plywood sheets of a sufficient size that a single sheet may be used to face an entire wall of a prefabricated building such as a dwelling house so that trussed structural panels may be produced that are rigid and self-sustaining. The use of these large sets renders it possible to provide such a prefabricated building in which all parts of the building are completed at the factory and the only on-location work is the slight amount necessary to assemble the comparatively few units together to form the completed building, no auxiliary framing or trusses being required for any part of the building.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A press platen for exerting substantially uniform pressure on panels over the entire area thereof comprising a rigid core of honeycomb construction, parallel perforated plates secured to opposite faces of said core and a flexible imperforate sheet overlying each plate and sealed along its edges to said core in fluid tight relation, whereby upon the application of fluid pressure to the interior of said core and through said perforations to the inner surface of said sheets said sheets will move away therefrom and exert substantially uniform pressure over the entire usable area thereof and without regard to irregularities in the surface of said panels.

2. A press platen for exerting substantially uniform pressure on panels over the entire area thereof comprising a rigid core of honeycomb construction, a parallel perforated plate secured to at least one face of said core and a flexible imperforate sheet overlying said plate and sealed along its edges to said core in fluid tight relation, whereby upon the application of fluid pressure to the interior of said core and through said perforations to the inner surface of said sheet said sheet will move away therefrom and exert a substantially uniform pressure over the entire usable area thereof and without regard to irregularities in the surface of said panels.

3. A press platen for exerting substantially uniform pressure on panels over the entire area thereof comprising a core having fluid passages therein, said passages opening to opposite surfaces of said core, parallel perforated plates secured to said surfaces of said core and a flexible imperforate sheet overlying each plate and sealed along its edges to said core in fluid tight relation whereby upon the introduction of fluid pressure to said passages and through said perforations to the inner surface of said sheets said sheets will move away from said core and exert a substantially uniform pressure over the entire usable area thereof and without regard to irregularities in the surface of said panels.

4. A press platen as defined in claim 1 in which there is provided rollers on opposite sides of said platen to facilitate the placing and removal of said panels.

DAVID E. HERVEY.

REFERENCES CITED

The following references are of record in the file of this patent:

UNITED STATES PATENTS

| Number | Name | Date |
|---|---|---|
| 376,828 | Patterson | Jan. 24, 1888 |
| 477,158 | Sprewitz | June 14, 1892 |
| 508,112 | Miller | Nov. 7, 1893 |
| 652,813 | Seiberling | July 3, 1900 |
| 673,409 | Nichols | May 7, 1901 |
| 764,150 | Ridings | July 5, 1904 |
| 1,297,219 | Merritt | Mar. 11, 1919 |
| 1,321,517 | Frederick | Nov. 11, 1919 |
| 1,561,063 | Dunlap | Nov. 10, 1925 |
| 1,563,684 | Black | Dec. 1, 1925 |
| 1,664,207 | Francis | Mar. 27, 1928 |
| 1,709,716 | Fielder | Apr. 16, 1929 |
| 1,777,310 | Hopkinson | Oct. 7, 1930 |
| 1,782,852 | Jeffray | Nov. 25, 1930 |
| 1,841,714 | Cone | Jan. 19, 1932 |
| 1,868,538 | McKee | July 26, 1932 |
| 1,870,517 | Lacey | Aug. 9, 1932 |
| 1,929,897 | Merritt et al. | Oct. 10, 1933 |
| 1,937,169 | Robinson | Nov. 28, 1933 |
| 2,084,980 | Sweeney | June 22, 1937 |
| 2,094,862 | Welch | Oct. 5, 1937 |
| 2,127,278 | Welch | Aug. 16, 1938 |
| 2,156,386 | Frick | May 2, 1939 |
| 2,183,599 | Welch | Dec. 19, 1939 |
| 2,264,125 | Wolf | Nov. 25, 1941 |
| 2,297,120 | Wilson et al. | Sept. 29, 1942 |
| 2,322,962 | Dickson et al. | June 29, 1943 |
| 2,340,607 | Maurer | Feb. 1, 1944 |
| 2,363,107 | Young | Nov. 21, 1944 |
| 2,363,431 | Moorehouse | Nov. 21, 1944 |
| 2,363,779 | Duffy | Nov. 28, 1944 |
| 2,363,933 | Bendix | Nov. 28, 1944 |
| 2,364,597 | Atwood | Dec. 12, 1944 |
| 2,370,322 | Nebesar | Feb. 27, 1945 |
| 2,373,770 | Martin | Apr. 17, 1945 |
| 2,390,159 | Laucks et al. | Dec. 4, 1945 |
| 2,412,534 | Randall | Dec. 10, 1946 |
| 2,418,233 | McClary | Apr. 1, 1947 |
| 2,426,414 | Pullen | Aug. 26, 1947 |

FOREIGN PATENTS

| Number | Country | Date |
|---|---|---|
| 13,419 | Great Britain | Oct. 12, 1886 |
| 511,230 | France | Dec. 20, 1920 |
| 520,254 | Germany | Mar. 1, 1928 |